Dec. 25, 1923.
C. L. NELSON
PIPE COUPLING
Filed Nov. 2, 1921
1,478,452
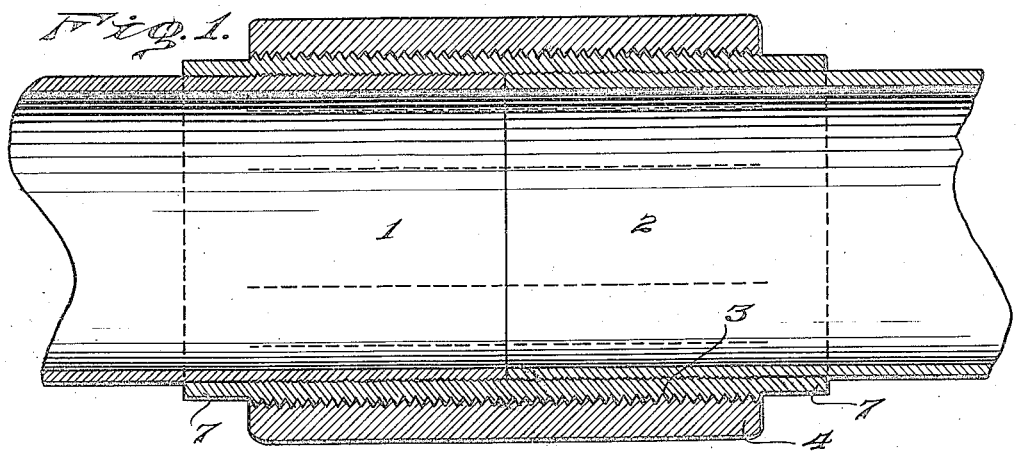
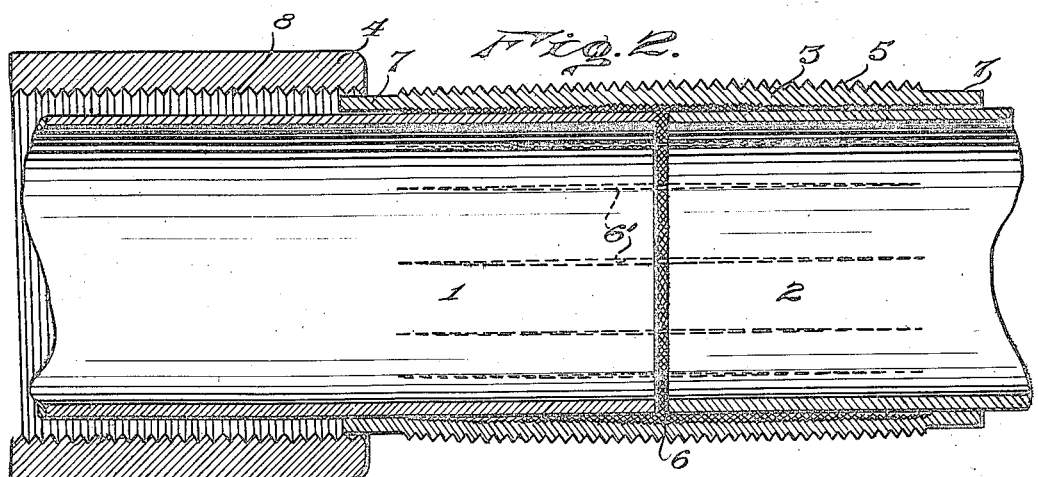
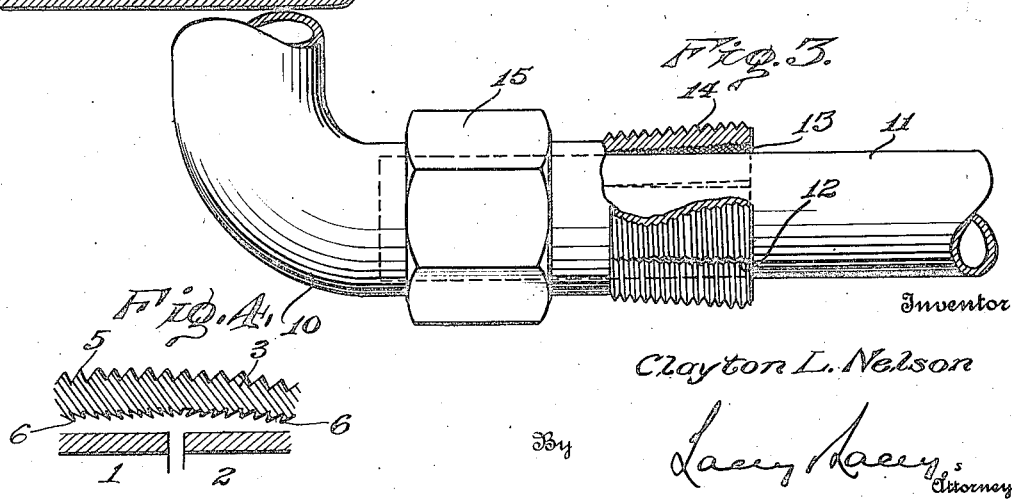
Inventor
Clayton L. Nelson
By
Attorneys Patented Dec. 25, 1923.

1,478,452

UNITED STATES PATENT OFFICE.

CLAYTON L. NELSON, OF ST. ALBANS, VERMONT.

PIPE COUPLING.

Application filed November 2, 1921. Serial No. 512,229.

*To all whom it may concern:*

Be it known that I, CLAYTON L. NELSON, a citizen of the United States, residing at St. Albans, in the county of Franklin and State of Vermont, have invented certain new and useful Improvements in Pipe Couplings, of which the following is a specification.

My invention relates to improvements in pipe couplings and has for its object the provision of means whereby the meeting ends of pipes may be very quickly and securely connected and leakage through the joint prevented. Another object of the invention is to provide means whereby the meeting ends of the pipes will be connected by a member which cannot readily become loose after having once been set to connect the pipe sections. The invention is illustrated in the accompanying drawings and will be hereinafter fully set forth.

In the drawings—

Figure 1 is a longitudinal section through my improved pipe coupling showing the same fully applied;

Fig. 2 is a similar view showing the parts as arranged before being fully applied;

Fig. 3 is a view, partly in elevation and partly in section, of another form of the invention particularly adapted for use in joining an elbow to a straight section of pipe;

Fig. 4 is a detail view showing a portion of Fig. 2 on a larger scale.

In the drawings, the reference numerals 1 and 2 indicate the meeting ends of alined pipe sections, these pipe sections being preferably smooth upon both their interior and their exterior circumferential surfaces. In applying my invention and assembling the same in connection with the pipe sections, I employ a coupling sleeve 3 which is slipped over the end of one pipe section before the sections are brought together. I also employ a ferrule 4 which is of greater diameter than the sleeve and is slipped over the end of one pipe section before the sleeve is placed thereon, as shown in Fig. 2. After the sleeve and the ferrule have been placed upon one pipe section, the section to be joined is brought into alinement with the section carrying the sleeve and the ferrule, after which the sleeve is drawn forward so as to extend over the end of the meeting pipe section and bridge the joint between the same, as shown in Figs. 1 and 2. The sleeve is threaded exteriorly, as shown at 5, and upon its internal surface is constructed with teeth 6 which, at the opposite sides of its transverse center, are pointed in opposite directions so that the teeth upon each half of the sleeve project inwardly from the respective end of the sleeve toward the center thereof. I also form narrow slits 6' longitudinally of the sleeve which terminate short of the ends thereof and the sleeve is preferably somewhat resilient between its end portions 7 which are smooth both exteriorly and interiorly, and the interior diameter of which is such that the sleeve will fit snugly around the pipe section. The ferrule 4 is internally threaded, as shown at 8, and is adapted to engage the external threads 5 of the sleeve. After the sleeve has been brought into encircling engagement with the ends of both pipe sections, the ferrule is slid forward and is rotated so that its threads 8 will operatively engage the threads 5 of the sleeve, this action causing the sleeve to be compressed around the ends of the pipe sections so that the teeth 6 on the sleeve will be forced into the surfaces of the respective pipe sections and the sleeve, consequently, intimately secured thereto. The longitudinal slits 6' in the sleeve will facilitate the compressing action and the sleeve will be forced into such close binding engagement with the pipe sections that the use of packing will be unnecessary.

In Fig. 3, I have shown an elbow 10 which is connected with a straight pipe section 11, the end of the elbow being fitted over the pipe section, as shown. The end of the elbow is constructed with longitudinal slits 12 and teeth 13 are formed upon the inner circumference of said end, while threads 14 are formed upon the outer circumference thereof. It will be noted that the portions of the elbow end between the slits 12 will flare somewhat so as to readily admit the end of the pipe section and avoid breaking of the teeth 13 during the assembling of the parts. A ferrule or collar 15 is fitted upon the elbow behind the threaded extremity of the same and after the pipe section 11 has been inserted in the elbow end, this collar or ferrule is brought forward into engagement with the threaded extremity of the elbow and is rotated about the same so that the threaded engagement of the collar or ferrule and the split end of the elbow will compress the extremity of the elbow into binding engagement with the pipe section 11 just as the sleeve 3 is forced into binding engagement with the pipe sections in the previously described form. Both ends of the elbow may, of course, be secured in the same manner, and my improved coupling may be applied to all pipe fittings.

It will be readily noted that my improved pipe coupling comprises very few parts which may be easily and quickly applied to pipes of any diameter and when the ferrule or collar has been turned home, the parts will be very securely connected and a tight joint produced.

Having thus described the invention, what is claimed as new is:

1. A pipe coupling comprising a single encircling member having a plurality of longitudinal slits and provided with teeth upon its inner surface and with threads upon its outer surface, and an internally threaded cylindrical compressing member adapted to fit around the said encircling member in threaded engagement therewith whereby to compress the same and force the teeth on the inner surface thereof into an encircled pipe section.

2. A pipe coupling comprising a coupling sleeve provided with longitudinal slits terminating short of the ends of the sleeve, the slitted portion of the sleeve being externally threaded and normally expanded circumferentially and further provided on its inner surface with teeth projecting inwardly from its ends toward its center, and a cylindrical internally threaded ferrule adapted to engage around the sleeve and compress the same whereby to embed the internal teeth in pipe sections fitted within the ends of the coupling sleeve.

In testimony whereof I affix my signature.

CLAYTON L. NELSON. [L. S.]